(12) United States Patent
Hosokawa et al.

(10) Patent No.: US 10,578,893 B2
(45) Date of Patent: Mar. 3, 2020

(54) OPTICAL WAVEGUIDE ELEMENT

(71) Applicant: SUMITOMO OSAKA CEMENT CO., LTD., Tokyo (JP)

(72) Inventors: Yoichi Hosokawa, Tokyo (JP); Masayuki Motoya, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 16/360,033

(22) Filed: Mar. 21, 2019

(65) Prior Publication Data

US 2019/0302493 A1   Oct. 3, 2019

(30) Foreign Application Priority Data

Mar. 28, 2018   (JP) .................. 2018-061211

(51) Int. Cl.

| | |
|---|---|
| *G02F 1/035* | (2006.01) |
| *G02F 1/225* | (2006.01) |
| *G02F 1/03* | (2006.01) |
| *G02B 6/12* | (2006.01) |
| *G02F 1/21* | (2006.01) |

(52) U.S. Cl.
CPC ............. *G02F 1/0356* (2013.01); *G02B 6/12* (2013.01); *G02F 1/0316* (2013.01); *G02F 1/2255* (2013.01); *G02F 2001/212* (2013.01)

(58) Field of Classification Search
None
See application file for complete search history.

(56) References Cited

U.S. PATENT DOCUMENTS

| | | | | |
|---|---|---|---|---|
| 7,068,863 | B2 * | 6/2006 | Kondo | G02F 1/0356 385/131 |
| 7,502,530 | B2 * | 3/2009 | Kondo | G02F 1/0356 385/1 |
| 2003/0044100 | A1 | 3/2003 | Kondo et al. | |
| 2009/0324158 | A1 * | 12/2009 | Shiraishi | G02B 6/13 385/2 |

FOREIGN PATENT DOCUMENTS

JP        3963313        8/2007

* cited by examiner

*Primary Examiner* — Chad H Smith
(74) *Attorney, Agent, or Firm* — JCIPRNET

(57) ABSTRACT

An optical waveguide element that has improved frequency response in a high frequency region is provided. An optical waveguide element includes: a substrate that has an electro-optic effect; an optical waveguide that is formed on the substrate; a control electrode that is for modulating light waves propagating through the optical waveguide; and a reinforcing substrate that holds the substrate via an adhesion layer, and the reinforcing substrate has a low-dielectric constant portion with a lower dielectric constant than that of the reinforcing substrate at least in a part of a region in a plan view of the reinforcing substrate such that the low-dielectric constant portion partitions the reinforcing substrate in a thickness direction.

5 Claims, 3 Drawing Sheets

OPTICAL WAVEGUIDE ELEMENT

CROSS-REFERENCE TO RELATED APPLICATION

This application claims the priority benefit of Japan application no. 2018-061211, filed on Mar. 28, 2018. The entirety of each of the above-mentioned patent applications is hereby incorporated by reference herein and made a part of this specification.

BACKGROUND

Technical Field

The present disclosure relates to an optical waveguide element that has a substrate that has an electro-optic effect, an optical waveguide that is formed on the substrate, and a control electrode that modulates light waves propagating through the optical waveguide.

Description of Related Art

In the field of optical communication and the field of optical measurement, optical waveguide elements that have substrates that have an electro-optic effect, optical waveguides that are formed on the substrates, and control electrodes that modulate light waves propagating through the optical waveguides have been used in many cases. Some optical waveguide elements include optical waveguides that have higher refractive indexes than that of a substrate material due to different materials being added to the substrates such as quartz, lithium niobate, semiconductors, and polymer materials, or are formed as ridge-shaped protrusions on the substrate.

In recent years, an optical waveguide element with a structure in which a waveguide substrate with an optical waveguide formed therein is thinned and a reinforcing substrate is bonded to the rear surface of the waveguide substrate with an adhesive layer to reinforce the waveguide substrate has been developed. According to such an optical waveguide element, it is possible to avoid a loss (ripple) of transmission properties (S21) due to substrate resonance observed in the optical waveguide element using a thick waveguide substrate with a thickness of several hundreds of micrometers to several millimeters in the related art.

However, it has been discovered that S21 ripple appears in a millimeter wave region. This is because millimeter waves leak on the side of the reinforcing substrate. As a countermeasure thereof, Patent Document 1 (Japanese Patent No. 3963313) discloses a method of providing a metal layer (gold or copper) on the upper surface of the reinforcing substrate, that is, on the side below the adhesive layer, thereby avoiding leakage of millimeter wave signals.

However, a complicated process is needed to form the metal layer on the reinforcing substrate. Also, only properties up to 50 GHz have been taken into account in Patent Document 1, and there is still a problem of a higher frequency region that is taken into account in 5G technologies or the like. Also, although a thinner waveguide substrate is more advantageous for a decrease in Vπ, there is also a problem that an electromagnetic field is disturbed by the metal layer on the rear surface due to a thin waveguide substrate, which leads to further degradation in frequency response.

The disclosure provides an optical waveguide element that solves the aforementioned problems and has improved frequency response in a high frequency region.

An optical waveguide element according to the disclosure has the following technical features in order to solve the aforementioned problems.

SUMMARY (1) According to an embodiment, there is provided an optical waveguide element including: a substrate that has an electro-optic effect; an optical waveguide that is formed on the substrate; a control electrode that is for modulating light waves propagating through the optical waveguide; and a reinforcing substrate that holds the substrate via an adhesion layer, the reinforcing substrate has a low-dielectric constant portion with a lower dielectric constant than that of the substrate in at least a part of a region of the reinforcing substrate in a plan view such that the low-dielectric constant portion partitions the reinforcing substrate in a thickness direction.

DESCRIPTION OF THE EMBODIMENTS

Figure 1:
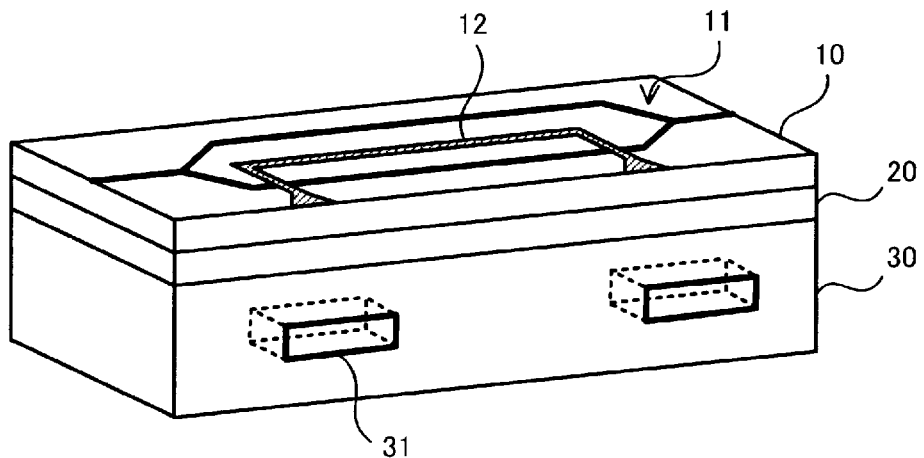
FIG. 1 is a diagram illustrating an example of an optical waveguide element according to an embodiment of the disclosure.
Figure 2:
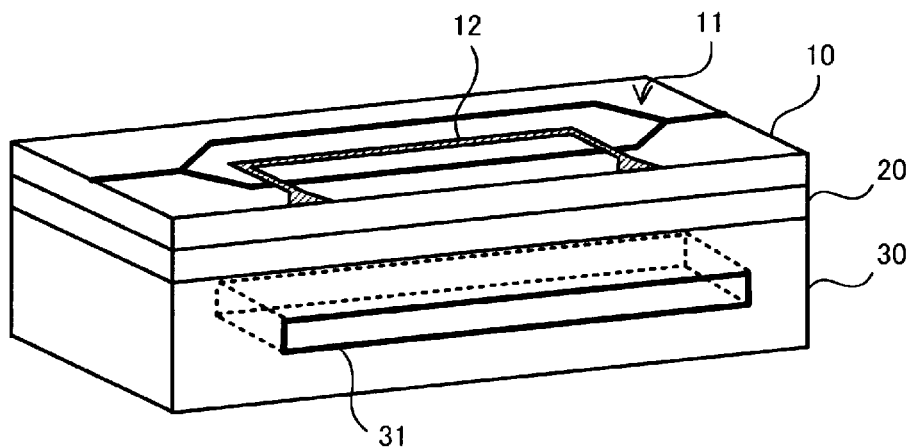
FIG. 2 is a diagram illustrating another example of an optical waveguide element according to an embodiment of the disclosure.

An optical waveguide element according to the disclosure will be described in detail with reference to the embodiments. Note that the disclosure is not limited to the examples described below. FIG. 1 is a diagram illustrating an example of an optical waveguide element according to an embodiment of the disclosure. FIG. 2 is a diagram illustrating another example of the optical waveguide element according to the embodiment of the disclosure.

An optical waveguide element according to the disclosure includes: a substrate 10 that has an electro-optic effect; an optical waveguide 11 that is formed on the substrate; a control electrode 12 that is for modulating light waves propagating through the optical waveguide; and a reinforcing substrate 30 that holds the substrate via an adhesion layer 20, and the reinforcing substrate has a low-dielectric constant portion 31 with a lower dielectric constant than that of the reinforcing substrate in at least a part of a region in a plan view of the reinforcing substrate such that the low-dielectric constant portion partitions the reinforcing substrate in a thickness direction, as illustrated in FIGS. 1 and 2.

A material of the substrate 10 is not particularly limited as long as it is possible to form the optical waveguide on the substrate, and is for example quartz, lithium niobate, or a semiconductor material. In a case in which light waves propagating through the optical waveguide are modulated with an electric field formed by an electrode of an optical modulator or the like, a substrate that has an electro-optic effect may be used, such as lithium niobate or lithium tantalate. Also, it is possible to more effectively apply the disclosure to a case in which a thin substrate with a thickness of equal to or less than 30 μm is used. Substrates that have an electro-optic effect include a crystal substrate with a film that has an electro-optic effect formed thereon through epitaxial growth, for example.

As a method of forming the optical waveguide 11, a method of thermally diffusing metal such as Ti in the substrate and forming a portion with a higher refractive index than that of the substrate material, a method of forming irregularity on the surface of the substrate to configure a ridge-type waveguide, or the like can be applied. As the optical waveguide 11, a Mach-Zehnder-type waveguide, a nest-type waveguide in which a Mach-Zehnder-type waveguide is combined in a nested form, or the like can be used.

As the control electrode 12, a modulation electrode to which high-frequency signals (RF signals) are applied and a ground electrode surrounding the modulation electrode, a bias electrode to which DC signals are applied, and the like may be exemplified. Note that FIGS. 1 and 2 illustrate only the modulation electrode. These control electrodes can be formed by a gold plating method or the like after forming an electrode pattern with Ti or Au on the surface of the substrate. Further, it is also possible to provide a buffer layer of dielectric $SiO_2$ or the like on the surface of the substrate after forming the optical waveguide as needed.

The reinforcing substrate 30 is bonded to the rear surface (lower side) of the substrate 10 via the adhesion layer 20 in order to enhance a mechanical strength of the optical waveguide element. The reinforcing substrate 30 can be formed using various materials similarly to the substrate 10. Although a material that is the same as that of the substrate 10 for the reinforcing substrate 30 may be used, a different material may also be used.

The refractive index of the adhesion layer 20 may lower than that of an electro-optical material that forms the substrate 10. Also, the dielectric constant of the adhesion layer 20 may lower than that of the electro-optical material that forms the substrate 10. For the adhesion layer 20, it is possible to use various adhesives such as an epoxy adhesive, a thermosetting adhesive, or an ultraviolet curable adhesive, for example.

As a main feature of the disclosure, the reinforcing substrate 30 has the low-dielectric constant portion 31 at least in a part of the region in a plan view of the reinforcing substrate such that the low-dielectric constant portion 31 partitions the reinforcing substrate in the thickness direction. That is, the low-dielectric constant portion 31 is provided at a midpoint portion of the reinforcing substrate in the thickness direction rather than on the front surface (upper side) or the rear surface (lower side) of the reinforcing substrate 30.

Since the effective dielectric constant of the reinforcing substrate decreases if the low-dielectric constant portion is interposed at a part of the reinforcing substrate in this manner, the resonance frequency in the reinforcing substrate shifts to a higher frequency. As a result, it is possible to cause the S21 ripple caused by the aforementioned resonance phenomenon to shift the higher frequency and thereby to improve the frequency response in a millimeter wave region.

The low-dielectric constant portion 31 may have a lower dielectric constant than that of the substrate 10 and may be a simple hollow. However, the low-dielectric constant portion 31 may be filled with a low-dielectric constant material with a lower dielectric constant than that of the substrate in order to enhance mechanical strength. For the low-dielectric constant member, various materials can be used to form the low-dielectric constant portion similarly to the adhesion layer 20. Although a material that is the same as that of the adhesion layer 20 may be used for the low-dielectric constant material, a different material may also be used.

As the region where the low-dielectric constant portion 31 is provided on the reinforcing substrate 30, any region may be employed as long as effects of control signals for high frequency waves applied to the control electrode 12 are readily exhibited. Specifically, the low-dielectric constant portion 31 may be provided in a region below an input end or an output end of the control electrode 12 as illustrated in FIG. 1. Further, the low-dielectric constant portion 31 may be provided in a region below an active section of the control electrode 12, that is, a section in which a modulation action is caused to affect light waves propagating through the optical waveguide 11 as illustrated in FIG. 2.

Note that it is possible to simply create the low-dielectric constant portion 31 illustrated in FIGS. 1 and 2 by using a recessed portion that can be formed by working a groove from the side surface to the inside of the reinforcing substrate 30 with a dicer or the like. As described above, the hollow portion of the recessed portion may be filled with the low-dielectric constant material and thus be reinforced. It is a matter of course that the low-dielectric constant portion may be formed by another method. For example, it is also possible to form the reinforcing substrate that has a low-dielectric constant portion only in a region below an active section of the control electrode by bonding two substrates, at least one of which has a recessed portion therein, in an arrangement in which the recessed portion faces the inside thereof.

Figure 3:
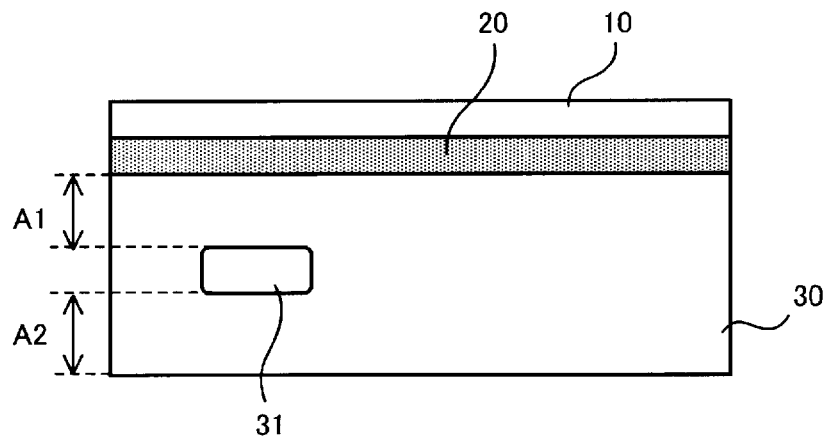
FIG. 3 is a diagram for describing a position of a low-dielectric constant portion in a thickness direction of a reinforcing member.
Figure 4:
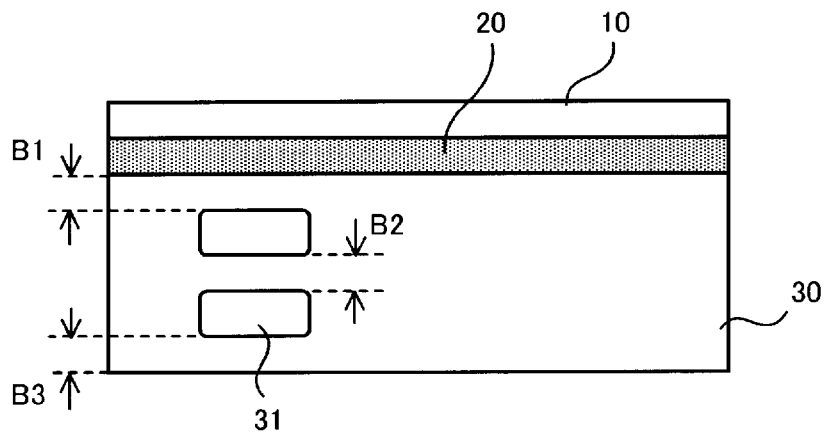
FIG. 4 is a diagram for describing a position of the low-dielectric constant portion in the thickness direction of the reinforcing member.

The low-dielectric constant portion 31 may be provided at a position at which the low-dielectric constant portion 31 substantially equally divides the reinforcing substrate 30 in the thickness direction as illustrated in FIG. 3 (A1≈A2). Also, a plurality of low-dielectric constant portions 31 may be provided in the thickness direction of the reinforcing substrate 30. In this case, the thicknesses of the respective sections of the reinforcing substrate 30 may be divided by the plurality of low-dielectric constant portions 31 in the thickness direction be substantially the same as each other (B1≈B2≈B3) as illustrated in FIG. 4.

Next, an effect of improving frequency response of the configuration according to the disclosure will be described with reference to FIGS. 5 and 6. Here, frequency response was verified under conditions that the thickness of the adhesion layer 20 was set to about 5T and the thickness of the reinforcing substrate 30 was set to about 50T on the assumption that the thickness of the substrate 10 was T.

Figure 5:
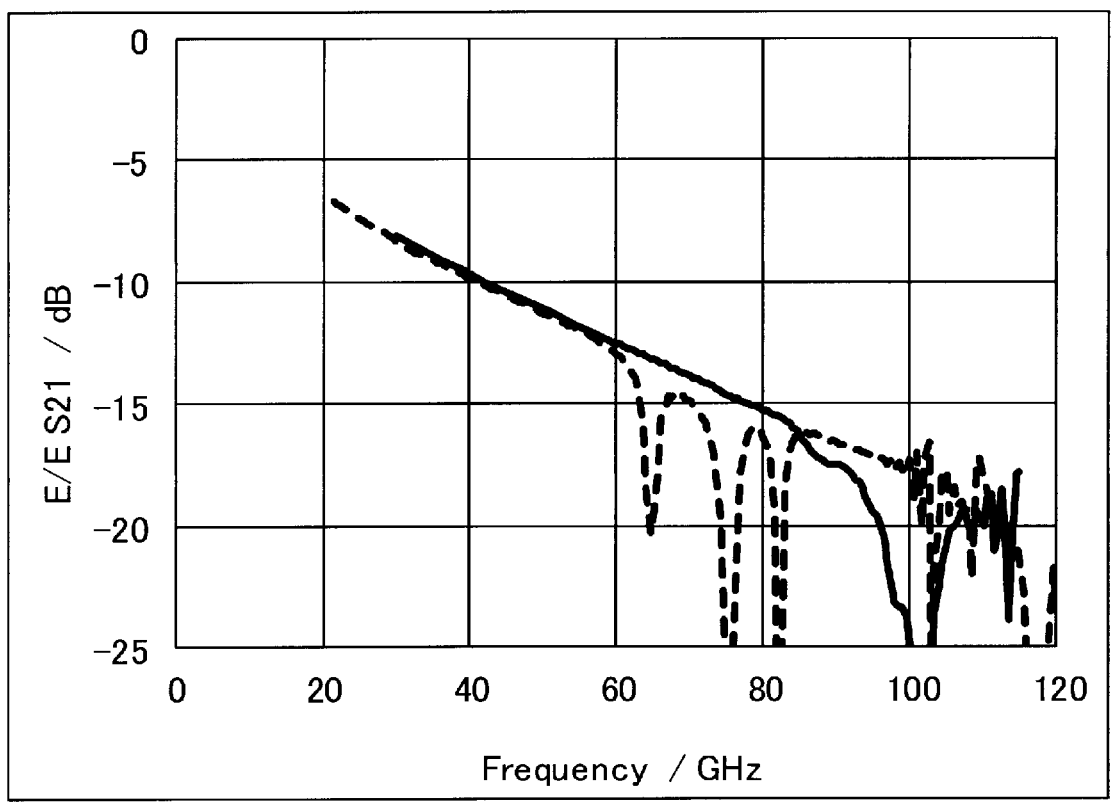
FIG. 5 is a diagram comparing frequency response in a configuration according to the disclosure with that in a configuration (1) in the related art.

FIG. 5 illustrates frequency response (dashed line) of the configuration (1) in the related art in which the reinforcing substrate 30 is merely bonded to the substrate 10 via the adhesion layer 20 and frequency response (solid line) of the configuration according to the disclosure in which the low-dielectric constant portion 31 is provided in the reinforcing substrate 30. Note that the configuration according to the disclosure has a structure in which the reinforcing substrate 30 is equally divided into three sections, namely a section above the low-dielectric constant portion 31, a section of the low-dielectric constant portion 31, and a section below the low-dielectric constant portion 31 in the thickness direction. According to FIG. 5, it is possible to understand that S21 ripple appeared after exceeding 50 GHz in the configuration (1) in the related art and that stable frequency response was obtained up to around 85 GHz in the configuration according to the disclosure.

Figure 6:
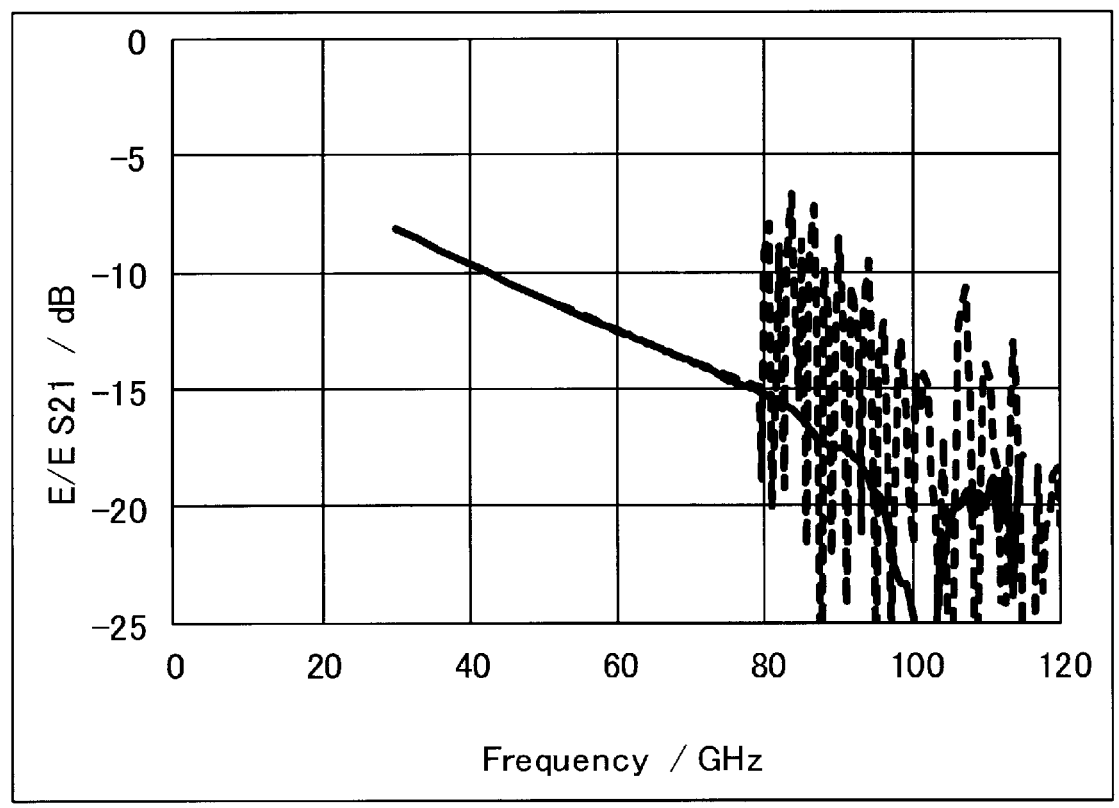
FIG. 6 is a diagram comparing frequency response in the configuration according to the disclosure with that in a configuration (2) in the related art.

FIG. 6 illustrates frequency response (dashed line) of the configuration (2) in the related art in which a metal film (Au) is provided on the surface of the reinforcing substrate 30, namely between the adhesion layer 20 and the reinforcing substrate 30 and frequency response (solid line) of the configuration according to the disclosure. Note that the configuration (2) in the related art corresponds to the configuration disclosed in Patent Document 1 described above as a background. According to FIG. 6, it is possible to understand that S21 ripple appeared from around the half after 70 GHz in the configuration (2) in the related art and that stable frequency response was obtained up to around 85 GHz in the configuration according to the disclosure.

According to the disclosure, it is possible to understand that the disclosure can improve the frequency response in the high frequency region as compared with the scheme in the related art. Also, the process of forming the metal film on the surface of the reinforcing substrate as in Patent Document 1 is not needed, and it is possible to easily provide an optical waveguide element that has improved frequency response in a high frequency region.

Although the disclosure has been described above on the basis of the embodiments, the disclosure is not limited to the aforementioned details, and design modifications can appropriately be made without departing from the gist of the disclosure. Also, it is needless to say that the respective embodiments can appropriately be combined.

According to the disclosure, it is possible to provide an optical waveguide element that has improved frequency response in a high frequency region.

The disclosure provides an optical waveguide element that solves the aforementioned problems and has improved frequency response in a high frequency region.

An optical waveguide element according to the disclosure has the following technical features in order to solve the aforementioned problems.

(1) According to an embodiment, there is provided an optical waveguide element including: a substrate that has an electro-optic effect; an optical waveguide that is formed on the substrate; a control electrode that is for modulating light waves propagating through the optical waveguide; and a reinforcing substrate that holds the substrate via an adhesion layer, the reinforcing substrate has a low-dielectric constant portion with a lower dielectric constant than that of the substrate in at least a part of a region of the reinforcing substrate in a plan view such that the low-dielectric constant portion partitions the reinforcing substrate in a thickness direction.

(2) In the optical waveguide element according to (1), the low-dielectric constant portion is provided at least in a region below an input end or an output end of the control electrode.

(3) In the optical waveguide element according to (1) or (2), the control electrode has an active section that causes a modulation action to affect the light waves propagating through the optical waveguide, and the low-dielectric constant portion is provided at least in a region below the active section.

(4) In the optical waveguide element according to any one of (1) to (3), the low-dielectric constant portion is formed by filling a recessed portion formed from a side surface toward an inside of the reinforcing substrate with a low-dielectric constant material with a lower dielectric constant than that of the substrate.

(5) In the optical waveguide element according to any one of (1) to (4), the low-dielectric constant portion is provided at a position at which the low-dielectric constant portion substantially equally divides the reinforcing substrate in the thickness direction.

According to the disclosure, since the reinforcing substrate that holds the substrate with the optical waveguide formed therein has the low-dielectric constant portion with a lower dielectric constant than that of the reinforcing substrate in at least a part of a region in a plan view of the reinforcing substrate such that the low-dielectric constant portion partitions the reinforcing substrate in the thickness direction, the frequency of ripple due to resonance in the reinforcing substrate shifts to a higher frequency. Therefore, it is possible to provide an optical waveguide element that has improved frequency response in a high frequency region.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical waveguide element comprising:
 a substrate that has an electro-optic effect;
 an optical waveguide that is formed on the substrate;
 a control electrode that is for modulating light waves propagating through the optical waveguide; and
 a reinforcing substrate that holds the substrate via an adhesion layer,
 wherein the reinforcing substrate has a low-dielectric constant portion with a lower dielectric constant than that of the substrate at least in a part of a region in a plan view of the reinforcing substrate such that the low-dielectric constant portion partitions the reinforcing substrate in a thickness direction, wherein the thickness direction is a laminating direction of the substrate and the reinforcing substrate.

2. The optical waveguide element according to claim 1, wherein the low-dielectric constant portion is provided at least in a region below an input end or an output end of the control electrode.

3. The optical waveguide element according to claim 1, wherein the control electrode has an active section that causes a modulation action to affect the light waves propagating through the optical waveguide, and the low-dielectric constant portion is provided at least in a region below the active section.

4. The optical waveguide element according to claim 1, wherein the low-dielectric constant portion is formed by filling a recessed portion formed from a side surface toward an inside of the reinforcing substrate with a low-dielectric constant material with a lower dielectric constant than that of the substrate.

5. The optical waveguide element according to claim 1, wherein the low-dielectric constant portion is provided at a position at which the low-dielectric constant portion substantially equally divides the reinforcing substrate in the thickness direction.

* * * * *